Sept. 18, 1962 K. M. ELLIOTT 3,054,744
MULTI-STAGE ENDOTHERMIC REACTIONS WITHOUT INTERMEDIATE REHEAT
Filed Sept. 18, 1953 3 Sheets-Sheet 1

INVENTOR
KENNETH M. ELLIOTT,
BY Francis J. Johnston
ATTORNEY

Sept. 18, 1962  K. M. ELLIOTT  3,054,744
MULTI-STAGE ENDOTHERMIC REACTIONS WITHOUT INTERMEDIATE REHEAT
Filed Sept. 18, 1953  3 Sheets-Sheet 2

INVENTOR
KENNETH M. ELLIOTT,
BY Francis F. Johnston
ATTORNEY

United States Patent Office 3,054,744
Patented Sept. 18, 1962

3,054,744
MULTI-STAGE ENDOTHERMIC REACTIONS
WITHOUT INTERMEDIATE REHEAT
Kenneth M. Elliott, Woodbury, N.J., assignor to Socony
Mobil Oil Company, Inc., a corporation of New York
Filed Sept. 18, 1953, Ser. No. 381,085
7 Claims. (Cl. 208—64)

The present invention relates to endothermic catalytic reactions carried out in a plurality of stages and, more particularly, to catalytic reforming carried out in a plurality of stages without reheating the effluent of a previous stage before introduction into a succeeding stage.

There are many catalytic endothermic reactions carried out in a plurality of stages wherein the vaporous effluent of one stage is reheated prior to entry into a succeeding stage. Illustrative of such catalytic endothermic reactions is the conventional reforming reaction in which one or more hydrocarbons capable of undergoing, separately or sequentially, the molecular changes: isomerization, dehydrogenation, hydrogenation and dehydrocyclization or aromatization or a mixture of such hydrocarbons with other hydrocarbons incapable of undergoing the aforesaid molecular changes, are subjected to temperatures of about 850° F. to about 1080° F. in the presence of particle-form solid reforming catalysts. Such reforming catalysts are metals or oxides of metals of group VI or group VIII of the periodic table associated with alumina or silica as a carrier.

In the present catalytic reforming processes a plurality of reactors is employed with hydrocarbon reactant reheating furnaces before the first reactor and intermediate each successive reactor and the previous reactor. These reheating furnaces are undesirable because of (1) loss of gasoline due to thermal reforming in the reheat furnaces, (2) the pressure drop in the furnaces requires a larger recycle gas compressor, and (3) excessive investment required for one or more reheat furnaces and a recycle gas compressor of excessive capacity.

It has now been discovered that with the same total catalyst to charge stock ratio, the same severity of reaction can be obtained employing a plurality of reactors without intermediate reheating of the charge stock between one reactor and the succeeding reactor. Accordingly, it is an object of the present invention to provide a multi-stage catalytic endothermic process in which the major portion of the required heat of reaction is provided in the catalyst, the catalyst flows in parallel through a plurality of reaction zones and the reactant flows through said plurality of reaction zones in series without reheating of said reactant intermediate successive reaction zones. It is another object of the present invention to provide a multi-stage reforming process in which a major portion of the required heat of reaction is provided in the catalyst, the catalyst flows in parallel through a plurality of reaction zones and the hydrocarbon reactant flows through said plurality of reaction zones in series without reheating of said reactant intermediate successive reaction zones. It is a further object of the present invention to provide a multi-stage reforming process in which at least 51 percent of the required heat of reaction in the first reaction zone through which the hydrocarbon reactant is passed is supplied by catalyst introduced thereinto, at least 90 percent of the required heat of reaction in reaction zones subsequent to said first reaction zone is supplied by catalyst introduced into said subsequent zones, catalyst flows in parallel through all of said reaction zones and said hydrocarbon reactant flows through said reaction zones in series. Other objects and advantages of the present invention will become apparent from the following description of the present invention taken in conjunction with the drawings in which.

In general, the primary problem in carrying out endothermic reactions is the means whereby the required heat of reaction is supplied to the reaction zones. Internal heat exchange means usually involve excessive capital and maintenance costs. Reheating of reactants intermediate successive reaction zones likewise is accompanied by increased costs and some operational problems particularly when one or more of the reactants participate in undesirable side reactions when heated much above the reaction temperature. Consequently, solution of the problem of supplying the required heat of reaction for an endothermic reaction, when found for a specific reaction employing particle-form solid catalyst, is useful for other chemically non-related but mechanically related endothermic process. Accordingly, the application of the principles of the present invention to the problem of supplying the required heat of reaction to a reforming reaction is illustrative of the solution of the problem of supplying the required heat of reaction to any endothermic reaction wherein a particle-form solid catalyst flows through a plurality of reaction zones and one or more of the reactants participates in undesirable side reactions when heated much above the reaction temperature of the endothermic reaction.

One of the advantages of the present invention is that the temperature gradient between the temperature at the reactor inlet and that at the reactor outlet can be kept at a minimum. Another advantage is that by supplying a major portion of the required heat of reaction in the particle-form solid catalyst, the reactant or reactants need not be heated above the reaction temperature, It is to be noted, for example, that while the hydrogen containing recycle gas employed as a gaseous heat carrier in the reforming of hydrocarbons in the presence of particle-form solid catalyst at times contains less than 3 mol percent of $C_4+$ hydrocarbons, superheating of the recycle gas to temperatures of 1000° F. to 1100° F. results in a loss of yield of reformed 10 R.V.P. gasoline. Accordingly, it is highly important to supply the required heat of the endothermic reaction by some means other than the organic reactants subject to undesirable side reactions when heated much above the reaction temperature. However, the problem is not solved by simply heating an excessive amount of catalyst to a temperature which must be in excess of the reaction temperature as is readily demonstrated by a comparison between the yields obtained with a single reaction zone through which a given amount of particle-form catalyst passes concurrent or counter-current to a given volume of hydrocarbon reactant and the yield obtained when contacting the same amount of particle-form catalyst with the same volume of hydrocarbon reactant in accordance with the principles of the present invention.

For example, a Mid-Continent virgin naphtha having a boiling range of 240° F. to 360° F., an octane number of 37 (F-1 clear) and 64 (F-1+3 cc. TEL) was reformed over a chromia-molybdenum-alumina type particle-form solid reforming catalyst at a recycle gas-to-naphtha ratio of 6 mols recycle gas per mol of naphtha employing in Case I a single reactor with concurrent flow of catalyst and naphtha; in Case II employing a single reactor and counter-current flow of catalyst and naphtha; and in Case III employing three reactors with hot catalyst flowing in parallel through the three reactors, the naphtha flowing through the three reactors in series and the catalyst and naphtha flowing concurrent in all three reactors.

*Table I*

|  | Case I<br>Single Reactor concurrent flow of catalyst and naphtha | Case II<br>Single Reactor counter-current flow of catalyst and naphtha | Case III<br>3 Reactors Catalyst in parallel naphtha in series concurrent flow of catalyst and naphtha in each reactor |
|---|---|---|---|
| Pressure, p.s.i.a | 190 | 190 | 190 |
| Catalyst Inlet Temp., °F | 1,100 | 1,100 | 1,100 |
| Total Catalyst to Naphtha Weight ratio | 4.4 | 4.4 | 4.4 |
| Vapor Temp. from Preheat Furnace, °F | 886 | 886 | 886 |
| Mixed Catalyst and Vapor Temp., °F | 980 | (1) | (2) |
| Catalyst Outlet Temp., °F | 920 | 880 | (2) |
| Vapor Outlet Temp., °F | 920 | 1,000 | (2) |
| Effective Average Bed Temp., °F | 931 | 800 | (2) |
| Naphtha Space Velocity v./hr./v | 0.7 | 0.7 | (2) |
| Octane Number of Product: |  |  |  |
| F-1 clear | 98 | 51 | 98 |
| F-1+3 cc. TEL | 103 | 75 | 103 |
| Yield 10 R.V.P. Gasoline Vol. percent Naphtha Feed | 72 | 111 | 79 |
| Net Heat of Reaction Required, B.t.u./lb. naphtha | 160 | 80 | 248 |
| Net Heat of Reaction supplied by Hot Catalyst, B.t.u./lb. naphtha | 160 | nil | 161 |

[1] Does not apply to counter-current flow.
[2] See Table II for conditions in each of three reactors.

The data presented in Table I establish that in concurrent flow of naphtha and catalyst through one reactor a yield of 72 volume percent of 10 R.V.P. gasoline at 103 octane number is obtained, as contrasted with a yield of 79 volume percent when the same charge naphtha is reformed to the same octane number at the same total catalyst to naphtha ratio in accordance with the principles of the present invention. It will also be noted, upon comparison of the "Mixed Catalyst and Vapor Temperature, °F." for Case I (980° F.) with the "Mixed Catalyst and Vapor Temperature, °F." for Case III (902; 905; and 924; Table II), that the high temperature (980° F.) at the top of the single reactor is eliminated. Study of the data obtained for counter-current flow of catalyst and naphtha establishes that a large portion of the required heat of the endothermic reaction cannot be supplied with hot catalyst and counter-current flow of catalyst and naphtha when the heat capacity of the catalyst is less than that of the vapors. All the catalyst does is to heat the vapors as they leave the reactor.

When the aforesaid Mid-Continent naphtha is reformed in accordance with the principles of the present invention, suitable conditions are such as those set forth in Table II.

*Table II*

Catalyst: Chromia-alumina-molybdenum (70 mol percent alumina, 8 mol percent molybdenum, balance chromia).
Recycle gas ratio: 6 mols recycle gas per mol naphtha.
Concurrent flow of catalyst and vapors in each reactor.
 (While three reactors were used two or more than three can be used.)
Total catalyst-to-naphtha weight ratio, 4.4.

|  | 1st Reactor | 2nd Reactor | 3rd Reactor |
|---|---|---|---|
| Pressure, p.s.i.a | 195 | 190 | 185 |
| Catalyst Inlet Temp., °F | 1,100 | 1,100 | 1,100 |
| Catalyst-to-Naphtha weight ratio | 0.5 | 2.2 | 1.7 |
| Vapor Inlet Temp., °F | 886 | 827 | 872 |
| Mixed Catalyst-Vapor Temp., °F | 902 | 905 | 924 |
| Catalyst-Vapor Outlet Temp., °F | 827 | 872 | 894 |
| Effective Average Bed Temp., °F | 842 | 879 | 900 |
| Naphtha Space Velocity, v./hr./v | 1.4 | 1.4 | 1.1 |
| Octane Number Feed: |  |  |  |
| F-1 Clear | 37 | 60 | 78 |
| F-1+3 cc. TEL | 64 | 81 | 92 |
| Octane Number Product: |  |  |  |
| F-1 Clear | 60 | 78 | 98 |
| F-1+3 cc. TEL | 81 | 92 | 103 |
| 10 R.V.P. Gasoline Yield Volume percent naphtha feed to first reactor | 107 | 98 | 79 |
| Net Heat of Reaction Required. B.t.u./lb. naphtha | 120 | 70 | 58 |
| Net amount of Reaction Heat Supplied by Hot Catalyst, b.t.u./lb. naphtha | 33 | 70 | 58 |
| Percent heat required in zone supplied by catalyst | 27 | 100 | 100 |
| Total net heat of reaction required, B.t.u./lb. naphtha | 248 | | |
| Total net amount of heat supplied by hot catalyst, B.t.u./lb. naphtha | 161 | | |
| Total net required heat of reaction supplied by hot catalyst, percent | 65 | | |

The conditions set forth in Table III likewise are suitable for reforming a naphtha in accordance with the principles of the present invention.

*Table III*

Hydrocarbon reactant: Virgin Columbian naphtha.
Boiling range:
 200° F. to 400° F.
Octane number:
 F-1 clear, 38.
 F-1+3 cc. TEL, 60.
Catalyst: Chromia-alumina.
Recycle gas ratio: 6 mols recycle gas per mol naphtha.

|  | 1st Reactor | 2nd Reactor | 3rd Reactor |
|---|---|---|---|
| Pressure, p.s.i.a | 45 | 40 | 35 |
| Catalyst Inlet Temp., °F | 1,100 | 1,100 | 1,100 |
| Catalyst-to-Naphtha, weight ratio | 5.5 | 3.0 | 1.7 |
| Vapor Inlet Temp., °F | 850 | 934 | 952 |
| Mixed Catalyst Vapor Temp., °F | 970 | 992 | 986 |
| Catalyst Vapor Outlet Temp., °F | 934 | 952 | 966 |
| Effective Average Bed Temp., °F | 940 | 960 | 970 |
| Naphtha Space Velocity, v.hr./v | 4.0 | 2.0 | 1.0 |
| Octane Number Feed: |  |  |  |
| F-1 Clear | 38 | 51 | 78 |
| F-1+3 cc. TEL | 60 | 77 | 91 |
| Octane Number Product: |  |  |  |
| F-1 Clear | 51 | 78 | 92 |
| F-1+3 cc. TEL | 77 | 91 | 99 |
| 10 R.V.P. Gasoline Yield volume percent naphtha feed to First Reactor | 96 | 91 | 84 |
| Net heat of reaction required, B.t.u./lb. naphtha | 105 | 90 | 40 |
| Net heat of reaction supplied by hot catalyst, B.t.u./lb. naphtha | 105 | 90 | 40 |
| Total net heat of reaction supplied by hot catalyst, percent | 100 | 100 | 100 |
| Total net heat of reaction required B.t.u./lb. of naphtha | 235 | | |
| Total net heat of reaction supplied by hot catalyst, B.t.u./lb. naphtha | 235 | | |

Illustrative of other conditions under which a naphtha can be reformed in accordance with the principles of the present invention are those presented in Table IV.

Table IV

Charge: Virgin Columbian naphtha.
Boiling range:
  200° F. to 400° F.
Octane number:
  F-1 clear, 38.
  F-1 + 3 cc. TEL, 60.
Catalyst: Chromia-alumina beads.
Recycle gas ratio: 6 mols recycle gas per mol naphtha.

|  | 1st Reactor | 2nd Reactor | 3rd Reactor |
| --- | --- | --- | --- |
| Pressure, p.s.i.a. | 195 | 190 | 185 |
| Catalyst Inlet Temp., ° F. | 1,200 | 1,200 | 1,200 |
| Catalyst-to-Naphtha weight ratio | 0.46 | 1.0 | 0.90 |
| Vapor Inlet Temp., ° F. | 970 | 953 | 970 |
| Mixed Catalyst Vapor Temp., ° F. | 988 | 990 | 1,000 |
| Catalyst Vapor Outlet Temp., ° F. | 953 | 970 | 986 |
| Effective Average Bed Temp., ° F. | 960 | 977 | 992 |
| Naphtha Space Velocity, v./hr./v. | 3.0 | 1.6 | 1.0 |
| Octane Number Feed: | | | |
| F-1 Clear | 38 | 65 | 81 |
| F-1+3 cc. TEL | 60 | 80 | 92 |
| Octane Number Product: | | | |
| F-1 Clear | 65 | 81 | 93 |
| F-1+3 cc. TEL | 80 | 92 | 100 |
| 10 R.V.P. Gasoline Yield Volume percent naphtha feed to first reactor | 95 | 90 | 83 |
| Net heat of reaction required B.t.u./lb. naphtha | 55 | 34 | 24 |
| Net amount of reaction heat supplied by hot catalyst, B.t.u./lb. naphtha | 30 | 34 | 24 |
| Total net amount of heat of reaction supplied by hot catalyst percent | 55 | 100 | 100 |
| Total required heat of reaction supplied by hot catalyst, percent | | 77 | |

In general, the operating conditions in each reaction zone are within the limits set forth in Table V.

Table V

|  | Broad | Preferred |
| --- | --- | --- |
| Pressure, p.s.i.a. | 15-600 | 25-200 |
| Recycle Gas Ratio: | | |
| Mols Recycle Gas / Mol Naphtha | 2-15 | 4-10 |
| Mols Hydrogen / Mol Naphtha | 1-8 | 2-5 |
| Catalyst-to-Naphtha, Weight Ratio | 0.1-20 | 0.4-8 |
| Space Velocity, v./hr./v. (Vol. of naphtha/Vol. of catalyst) | 0.1-10 | 0.5-5.0 |
| Average Reaction Zone Temp., ° F. | 700-1,050 | 800-1,000 |
| Kiln or Regenerator: | | |
| Temperature, ° F. | 900-1,400 | 1,000-1,100 |
| Pressure, p.s.i.a. | 15-600 | 15-35 |
| Heat supplied in hot catalyst to First Zone, percent heat required in First Zone | 0-100 | 25-100 |
| Heat supplied in hot catalyst to zones other than first zone, percent heat required in said zones | 51-100 | 75-100 |

Figures 1, 2:
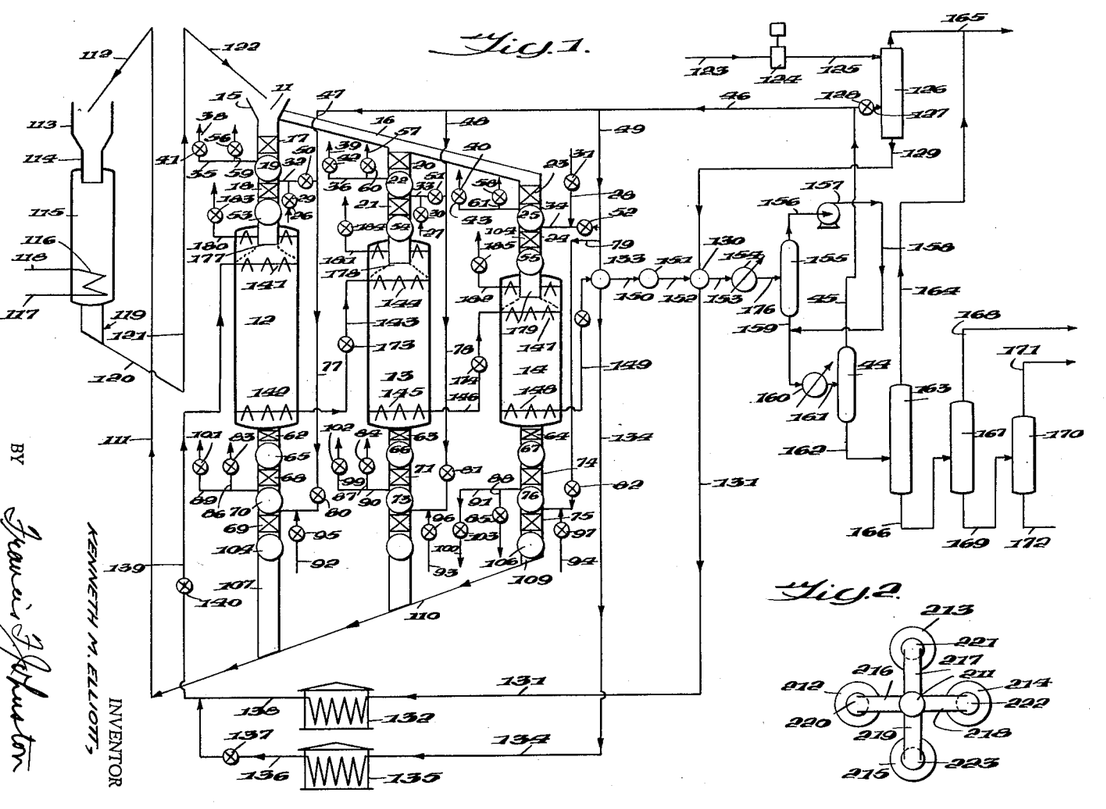
FIGURE 1 is a highly schematic flow sheet illustrative of the present invention as applied to the reforming of a hydrocarbon reactant in a plurality of reaction zones through which a particle-form solid catalyst passes in parallel flow and through which the hydrocarbon passes in series and concurrent with the catalyst through each reaction zone.
FIGURE 2 is a highly schematic representation of the spacial relation of a plurality of reaction zones alternative to those shown in FIGURES 1 and 3.

Referring now to FIGURE 1, those skilled in the art will understand that the drawing is a highly schematic flow sheet of a method of reforming a hydrocarbon reactant in three separate reactors wherein the reforming catalyst flows in parallel through the reactors and the hydrocarbon reactant flows in series therethrough. For simplicity of description and discussion, the paths of the reforming catalyst through the three reactors and regenerator will be described, followed by a description of the path of the hydrocarbon reactant through the three reactors. Those skilled in the art will understand that although three reactors are indicated, only two or more than three can be used, and as indicated in FIGURE 2, the spacial relation of the reactors is not critical. Furthermore, although only one regenerator is shown, a plurality of kilns or regenerators can be used. For example, each reactor can be provided with a separate regenerator or kiln.

Active catalyst in reactor feed bin 11 flows to all reactors 12, 13 and 14 through conduit 15 or conduit 16. When the reforming conversion takes place at pressures up to about 25 p.s.i.a., the catalyst can be fed directly from conduits 15 and 16 into reactors 12, 13 and 14 without passage through a catalyst transfer and reactor-sealing means such as illustrated. However, since it is generally preferred to have the reforming conversion take place at pressures above about 25 p.s.i.a., for example at about 100 to about 600 p.s.i.a. and particularly at about 100 to about 300 p.s.i.a., a catalyst transfer and reactor-sealing means is employed.

The particle-form solid catalyst transfer and reactor-sealing means, hereinafter referred to as catalyst transfer and reactor-sealing means, can be of any suitable type whereby particle-form solid reforming catalyst can be transferred from a zone of given pressure to a zone of higher pressure. The catalyst transfer and reactor-sealing means illustrated comprises two gas-tight valves and an intermediate pressuring chamber.

Thus, the active catalyst flows from hopper 11 through conduits 15 and 16 to catalyst transfer and reactor-sealing means comprising for reactor 12, gas-tight valves 17 and 18 and intermediate pressuring chamber 19; for reactor 13, gas-tight valves 20 and 21 and intermediate pressuring chamber 22; and for reactor 14, gas-tight valves 23 and 24 and intermediate pressuring chamber 25.

The catalyst transfer and reactor-sealing means operate in a cyclic manner. With gas-tight valves 18, 21 and 24 closed, gas-tight valves 17, 20 and 23 open and pressuring chambers 19, 22 and 25 are filled with catalyst to a predetermined level. Gas-tight valves 17, 20 and 23 close and the pressuring chambers 19, 22 and 25 are purged with an inert and/or non-flammable gas such as flue gas flowing from a source not shown through pipes 26, 27 and 28 under control of valves 29, 30 and 31 respectively to pipes 32, 33 and 34 and thence to chambers 19, 22 and 25 respectively. The purge is vented through pipes 35 and 38 under control of valve 41; pipes 36 and 39 under control of valve 42; and pipe 40 under control of valve 43 from chambers 19, 22 and 25 respectively.

When chambers 19, 22 and 25 are purged, valves 29, 30, 31, 41, 42 and 43 close, and pressuring gas such as recycle gas (described hereinafter) flows under pressure from liquid gas separator 44 through pipes 45 and 46 to pipes 47, 48 and 49 from which, under control of valves 50, 51 and 52 respectively, the pressuring gas flows to chambers 19, 22 and 25 through pipes 32, 33 and 34 respectively until the pressure in the pressuring chambers 19, 22 and 25 is at least that of the reactors 12, 13 and 14 respectively, and preferably about 5 to about 10 p.s.i. greater. Valves 50, 51 and 52 close and gas-tight valves 18, 21 and 24 open permitting the catalyst to flow from chambers 19, 22 and 25 respectively into surge chambers or vessels 53, 54 and 55 of reactors 12, 13 and 14 respectively.

When pressuring chambers 19, 22 and 25 are empty of catalyst gas-tight valves 18, 21 and 24 close. The chambers 18, 21 and 24 are vented to the pressure of feed hopper 11 by opening valves 56, 57 and 58 in pipes 59, 60 and 61 respectively. When the pressure in chambers 19, 22 and 25 has been lowered to that of feed hopper 11, the chambers are purged with an inert and/or non-flammable gas such as flue gas as described hereinbefore. This completes the cycle.

Those skilled in the art will understand that the foregoing description of the operation of the catalyst transfer and reactor sealing means is not suggestive that simultaneous operation of all catalyst transfer and reactor sealing means is mandatory but that the catalyst transfer and reactor-sealing means can be operated in any sequence required by local conditions or simultaneously.

The particle-form solid reforming catalyst in surge chamber 53, 54 and 55 flows into and through reactors 12, 13 and 14 as substantially compact columns and leaves reactors 12, 13 and 14 through catalyst flow control means 62, 63 and 64 respectively of any suitable type such as throttle valves. The catalyst flows from reactors 12, 13 and 14 into surge chambers 65, 66 and 67 respectively, from which the catalyst is removed, when reactors 12, 13 and 14 are at a pressure greater than that of the kiln or kilns by means of catalyst transfer and reactor sealing means of any suitable type whereby particle form solid catalyst can be transferred from a zone of given pressure to a zone of lower pressure.

The catalyst transfer and reactor sealing means illustrated in FIGURE 1 are similar to those previously described and operate in a similar cyclic manner simultaneously or in any suitable sequence as follows: With gas-tight valves 68, 69, 71, 74 and 75 closed, depressuring chambers 70, 73, and 76 are pressured to about the pressure under which reactors 12, 13 and 14 respectively are operating by gas such as recycle gas flowing under suitable pressure from liquid-gas separator 44 through pipes 45, 46, branches thereof, 47, 48 and 49 and connecting pipes 77, 78 and 79 under control of valves 80, 81 and 82 to chambers 70, 73 and 76 respectively. When the pressure in each of chambers 70, 73 and 76 is equal to that in the respective reactors 12, 13 and 14, valves 80, 81 and 82 close and gas-tight valves 68, 71 and 74 open and catalyst flows from surge chambers 65, 66 and 67 respectively into depressuring vessels 70, 73 and 76.

When vessels or chambers 70, 73 and 76 are filled with catalyst to a predetermined level, gas-tight valves 68, 71 and 74 close, valve 83, 84 and 85 in the pipes 86, 87 and 88 respectively open and the pressure in chambers 70, 73 and 76 is reduced to that of the kiln or kilns by venting the gases therein through pipes 89, 90 and 91. When the pressure in vessels 70, 73 and 76 has been reduced to the desired level, chambers 70, 73 and 76 are purged with an inert and/or non-flammable gas, such as flue gas, flowing from a source not shown through pipes 92, 93 and 94 under control of valves 95, 96 and 97 respectively. The purges are vented through pipes 89, 99 and 100 under control of valves 101, 102 and 103 respectively. After purging, valves 95, 96 and 97 are closed and gas-tight valves 69, 72 and 75 are opened permitting catalyst in chambers 70, 73 and 76 to flow into surge chambers 104, 105 and 106 respectively. When vessels 70, 73 and 76 are empty of catalyst, gas-tight valves 69, 72 and 75 close, completing a cycle.

The catalyst in surge chambers 104, 105 and 106 flows through conduits 107, 108 and 109 respectively to chute 110 and thence to catalyst transfer means 111 of any suitable type such as a gas-lift, etc., whereby the catalyst can be transferred to one or more kilns or regenerators.

The catalyst transfer means illustrated is an elevator discharging into chute 112 along which the partially deactivated catalyst flows to kiln feed hopper 113. From hopper 113, the partially deactivated catalyst flows through conduit 114 into kiln 115 of any suitable type wherein the coke deposited on the catalyst during passage through reactors 12, 13 and 14 can be burned in a stream of combustion supporting gas such as air.

The catalyst flows downwardly through kiln 115. Near the outlet thereof, kiln 115 is provided with a coil or other suitable heat exchange means 116 whereby the reactivated catalyst can be cooled when desired. Coil 116 is provided with an inlet 117 and an outlet 118 by means of which heat exchange medium such as low melting alloys, molten salts, steam, etc., can be brought into heat exchange relation with the hot reactivated catalyst.

The hot reactivated catalyst flows from kiln or regenerator 115 thorugh conduit 119 to chute 120 and thence to catalyst transfer means 121 such as a gas-lift or the like, an elevator, etc., whereby the reactivated catalyst is transferred to chute 122 and thence to feed hopper 11 completing a catalyst cycle.

The hydrocarbon reactant flows through the three reactors in series as follows: A hydrocarbon reactant, such as a virgin naphtha, a cracked naphtha or a mixture of virgin and cracked naphthas, flows from a source not shown through line 123 to pump 124 and is discharged therefrom through line 125 at a pressure somewhat higher than the reactor operating pressure. The hydrocarbon reactant flows along line 125 to absorber 126 where it contacts in a counter-current manner a portion of the cycle gas, usually about equal to the net gas make, flowing under pressure from gas-liquid separator 44 through pipes 45 and 127 under control of valve 128. In passage through absorber 126, the hydrocarbon reactant strips the gas of light hydrocarbons, the stripped gas flowing from absorber 126 through pipe 165 to a refinery fuel reservoir not shown.

The hydrocarbon reactant flows from absorber 126 through line 129 to heat exchanger 130 and thence through line 131 to heater or furnace 132 wherein it is heated to a temperature such that when mixed with heated recycle gas, as described hereinafter, the charge mixture so produced will have a temperature of about 900° F. to about 1000° F. Dependent upon the catalyst-to-oil ratio the major portion of the required heat of reaction supplied to the first reforming zone can be supplied either by the catalyst or the hydrocarbon reactant and/or gaseous heat carrier. However, in the succeeding reaction zones the major portion of the required heat of reaction is supplied by the catalyst.

The recycle gas, containing at least 25 percent hydrogen and preferably at least 35 percent hydrogen balance $C_1$ to $C_6$ hydrocarbons, flows under pressure somewhat higher than reactor pressure from liquid gas separator 44 through pipes 45, 46 and 49 to heat exchanger 133 and thence through pipe 134 to heater or furnace 135, wherein the recycle gas is heated to a temperature such that when mixed with the heated hydrocarbon reactant in line 138 to form a charge mixture, the charge mixture thus formed shall have a temperature of about 850° F. to about 1050° F. and preferably about 900° F. to about 1000° F.

The heated recycle gas flows from furnace 135 through pipe 136 under control of valve 137 to line 138 where it is mixed with the heated hydrocarbon reactant in the mol ratio of about 1 to about 15, preferably about 4 to about 10, mols of gas or about 1 to about 8, preferably about 2 to about 5, mols of hydrogen per mol of hydrocarbon reactant to form a heated charge mixture.

The heated charge mixture flows through line 139 under control of valve 140 to a distributor 141 of suitable type whereby the charge mixture is distributed over the cross-section of reactor 12. The vapors of the charge mixture flow downwardly from distributor 141 concurrent to the downwardly flowing substantially compact column of particle-form solid reforming catalyst. The reformate produced in reactor 12 together with recycle gas, make gas and any unconverted hydrocarbon reactant leaves reactor 12 via collector 142 and line 143 under control of valve 173 by means of which the pressure in reactor 12 is regulated.

The effluent from reactor 12, or charge mixture 2, flows to reactor 13 via line 143 and distributor 144 of any suitable type. The effluent from reactor 12 flows downwardly from distributor 144 concurrent to a downwardly flowing substantially compact column of particle-form solid reforming catalyst and leaves reactor 13 by way of collector 145 and line 146 under control of valve 174. The pressure in reactor 13 is controlled and regulated by valve 174.

The effluent from reactor 13, or charge mixture 3, flows along line 146 to distributor 147 of any suitable type in reactor 14. The effluent or charge mixture 3 flows downwardly from distributor 147 concurrent to the downwardly flowing substantially compact column of particle-form solid reforming catalyst and leaves reactor 14 through collector 148 and line 149 under control of valve 175. By means of valve 175 the pressure in reactor 14 is controlled and regulated.

The effluent from reactor 14, the final effluent comprising reformate, make gas and recycle gas flows through line 149 to heat exchanger 133, thence along line 150 to heat exchanger 151, line 152, heat exchanger 130, line 153 and condenser 154. From condenser 154 the condensed and uncondensed components of the final effluent flow along line 176 to liquid gas separator 155 wherein the uncondensed components of the effluent separate from the condensed components of the effluent and flow via pipe 156 to compressor 157 where the uncondensed effluent is pressured to at least the pressure in reactor 12. The condensed effluent flows from separator 155 through line 159 into which the pressured uncondensed effluent flows from pipe 158. The pressured condensed and uncondensed effluent flows through line 159 to cooler 160 and thence through line 161 to liquid gas separator 44 where the uncondensed effluent rises and leaves separator 44 through pipe 45 to recycle gas pipe 46.

The condensed effluent flows from separator 44 through line 162 to depropanizer 163 where an overhead is taken through line 164 to refinery fuel line 165. The bottoms of depropanizer 163 flow through line 166 to primary re-run tower 167 where a gasoline of improved octane rating is taken overhead through line 168 to storage and the bottoms flow through line 169 to secondary re-run tower 170.

In secondary re-run tower 170 a gasoline of improved octane rating is taken overhead through line 171 to storage and a bottoms flows through line 172 to storage.

It will be noted that each of the reactors 12, 13 and 14 is provided with a collector 177, 178 and 179 and a connecting line 180, 181 and 182, each having valve 183, 184 and 185 respectively.

These collectors are provided as a means for removing moisture from the fresh hot catalyst in the following manner. Valve 173 in effluent line 143 and valve 183 in line 180 of reactor 12; valve 174 in effluent line 146 and valve 184 in line 181 of reactor 13; and valve 175 in effluent line 149 and valve 185 in line 182 are all mutually adjusted so that a small portion, say about 1 to about 10 percent, of the vaporous contents of each reactor flows upwardly from distributors 141, 144 and 147 to collectors 177, 178 and 179 respectively. In the counter-current flow of the vapors upwardly from the distributors to the aforesaid collectors moisture and/or loosely bound oxygen, i.e., water in praesenti or potential water associated with the catalyst, is removed. The proportion of vapors flowing upwardly from distributors 141, 144 and 147 to collectors 177, 178 and 179 respectively is small but sufficient to lower the moisture (present or potential) content of the catalyst to less than about 0.5 to about 0.7 weight percent. The balance of the vapors passing downwardly through reactors 12, 13 and 14 to collectors 142, 145 and 148 respectively. In this manner, it is insured that the moisture content of the catalyst in reactors 12, 13 and 14 below distributors 141, 144 and 147 respectively shall be such as not to reduce substantially the yield of reformate.

The portions of the vapors bled-off from reactors 12, 13 and 14 can be dried and returned to the reactors or disposed of in any suitable manner.

Referring now to FIGURE 2. FIGURE 2 shows that the reactors need not be arranged in a straight line relation as illustrated in FIGURE 1 but can be arranged around a central feed hopper 211. Thus, central feed hopper 211 will serve to feed a plurality of reactors 212, 213, 214 and 215. The active catalyst in central feed hopper 211 flows along conduits 216, 217, 218 and 219 to catalyst transfer and reactor sealing means 220, 221, 222 and 223 respectively, of reactors 212, 213, 214 and 215.

Figure 3:
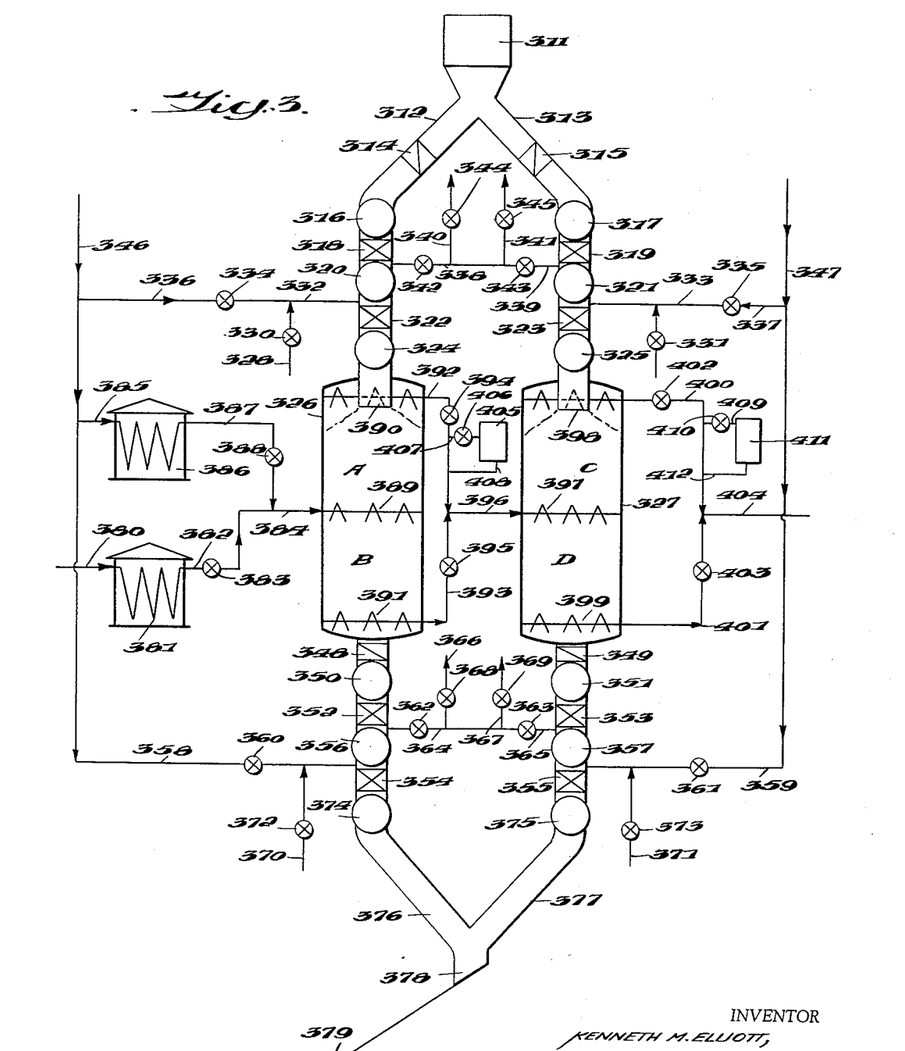
FIGURE 3 is a highly schematic flow sheet illustrative of a method of reforming a hydrocarbon reactant in accordance with the principles of the present invention in a plurality of reaction zones through which the catalyst passes in parallel flow and the hydrocarbon reactant in series with the flow of hydrocarbon reactant countercurrent and concurrent in adjacent reaction zones in each reactor.

Referring now to FIGURE 3 wherein is illustrated a method of reforming a hydrocarbon reactant in which the catalyst flows in parallel through two reactors each having two conversion zones in one zone of which the charge mixture flows upwardly counter-current to the downwardly flowing substantially compact column of catalyst and in the other zone the charge mixture flows downwardly concurrent with the downwardly flowing column of catalyst.

Active catalyst in feed hopper 311 flows through conduits 312 and 313 under control of catalyst flow means 314 and 315 of any suitable type such as throttle valves to surge chambers 316 and 317. When reactors 326 and 327 are operated at pressures substantially above atmospheric, i.e., substantially above 15 p.s.i.a., the catalyst is introduced into reactors 326 and 327 by means of a suitable catalyst transfer and reactor sealing means whereby particle-form solid contact mass material can be transferred from a zone of given pressure to a zone of higher pressure without substantial loss of vapors from the zone of higher pressure.

The catalyst transfer and reactor sealing means illustrated comprises for reactor 326, gas-tight valves 318 and 322 and intermediate pressuring chamber or vessel 320, and for reactor 327, gas-tight valves 319 and 323 and intermediate pressuring vessel or chamber 321. Both catalyst transfer and reactor sealing means operate in a cyclic manner as follows: With gas-tight valve 322 (323) closed, gas-tight valve 318 (319) opens and catalyst flows from surge chamber 316 (317) into pressuring chamber 320 (321). When pressuring chamber 320 (321) is filled to a predetermined level with catalyst, gas-tight valve 318 (319) closes. Chamber 320 (321) is purged with an inert and/or non-flammable gas such as flue gas flowing from a source not shown through pipe 328 (329) under control of valve 330 (331) to pipe 332 (333) with valve 334 (335) in pipe 336 (337) closed. The purge is vented from chamber 320 through pipes 338 and 340 with valves 342 and 344 open and valves 343 and 345 closed, and from chamber 321 through pipes 339 and 341 with valves 343 and 345 open and valves 342 and 344 closed. After purging, valves 330, 331, 342 and 343 are closed and chamber 320 (321) is pressured to at least reactor pressure and preferably to about 5 to 10 p.s.i. greater than reactor pressure with recycle gas flowing from a source not shown through pipes 346 (347), 336 (337) and 332 (333) under control of valve 334 (335). When the pressure in vessel 320 (321) has reached the desired value, gas-tight valve 322 (323) opens and catalyst flows into surge chamber 324 (325). When chamber 320 (321) is empty of catalyst, gas-tight valve 322 (323) closes and chamber 320 (321) is purged as described hereinbefore. This completes a cycle.

The catalyst flows from surge chamber 324 (325) into reactor 326 (327) and through reactor 326 (327) as a substantially compact column of particle form solid reforming catalyst. During passage through reactor 326 (327) coke is deposited on the catalyst partially deactivating same.

The partially deactivated catalyst flows from reactor 326 (327) through catalyst flow control means 348 (349) of any suitable type such as a throttle valve. From catalyst flow control means 348 (349) the catalyst flows to surge chamber 350 (351) from which, when the kiln or regenerator operates at a pressure below reactor pressure, the catalyst is removed by a suitable catalyst transfer and reactor-sealing means whereby particle form solid contact mass material can be transferred from a zone of given pressure to a zone of lower pressure without substantial loss of vapors from the zone of higher pressure. The catalyst transfer and reactor-sealing means illustrated is similar to that described hereinbefore and comprises gas-tight valves 352 and 354 (353 and 355) and intermediate depressuring chamber or vessel 356 (357). The catalyst transfer and reactor sealing means operates in a cyclic manner as follows: With gas-tight valves 352 and 354 (353 and 355) closed depressuring chamber 356 (357) is pressured to reactor pressure with a suitable gas such as recycle gas flowing from a source not shown through pipes 346 (347) and 358 (359) under control of valve 360 (361) with valve 362 (363) closed. Gas-tight valve 352 (353) opens while valve 360 (361) closes and chamber 356 (357) is filled to a predetermined level with partially deactivated catalyst, gas-tight valve 352 (353) closes and the pressuring gas is bled off through pipes 364 and 366 (365 and 367) under control of valves 362 and 368 (363 and 369) until the pressure is that of the kiln or regenerator (not shown).

Chamber 356 (357) is then purged with an inert and/or non-flammable gas such as flue gas flowing from a source not shown through pipe 370 (371) under control of valve 372 (373) and vented through pipes 364 and 366 (365 and 367) under control of valves 362 and 368 (363 and 369). After the purge, gas-tight valve 354 (355) opens and catalyst flows from chamber 356 (357) into surge vessel or chamber 374 (375). When chamber 356 (357) is empty of catalyst, gas-tight valve 354 (355) closes, completing a cycle. The catalyst flows from surge chamber 374 (375) through conduit 376 (377) to conduit 378 and chute 379 and thence to a catalyst transfer means of suitable type such as a gas-lift and the like, an elevator, etc., whereby the partially deactivated catalyst can be transferred to a kiln or regenerator in which the coke can be burned off in a stream of combustion-supporting gas such as air.

By burning off, the coke is reactivated and is transferred from the kiln or regenerator to feed hopper 311 in any suitable manner.

The hydrocarbon reactant, for example, a virgin or cracked naphtha, or a mixture of virgin and cracked naphthas, flows under suitable pressure from a source not shown through line 380 to furnace or heater 381 and thence through line 382 under control of valve 383 to charge mixture line 384. Recycle gas comprising at least 25 percent hydrogen, preferably at least 35 to 60 percent hydrogen, balance $C_1$ to $C_6$ hydrocarbons, flows under suitable pressure from a source not shown through pipe 346 to pipe 385 and thence through heater 386 and pipe 387 under control of valve 388 to charge mixture line 384.

In charge mixture line 384, recycle gas is mixed with hydrocarbon reactant in the mol ratio of 1 to 15 mols, preferably 4 to 10 mols of recycle gas or 1 to 8 mols, preferably 2 to 5 mols of hydrogen per mol of hydrocarbon per mol of hydrocarbon reactant. The molecular weight of the hydrocarbon reactant being determined in the usual manner from the A.S.T.M. distillation.

In heaters 381 and 386, the hydrocarbon reactant and the recycle gas are heated to temperatures such that when mixed in the proportions set forth hereinbefore to form a charge mixture, the charge mixture has a temperature of about 850° F. to about 1050° F.

The charge mixture flows through line 384 to distributor 389 from which a portion of the charge mixture flows upwardly counter-current to the downwardly flowing substantially compact column of particle-form solid reforming catalyst to leave reaction zone A through collector 390 and line 392, and a portion flows downwardly concurrent with the downwardly flowing substantially compact column of particle form solid reforming catalyst to leave zone B through collector 391 and line 393.

The distribution of the charge mixture between reaction zone A and reaction zone B is controlled and regulated by throttling means 394 and 395 in effluent lines 392 and 393 respectively, as described in the co-pending application for United States Letters Patent, Serial No. 285,481, filed May 1, 1952, in the name of Kenneth M. Elliott, now U.S. Patent No. 2,763,308, issued March 13, 1956. At this point it is to be noted that while the method illustrated in FIGURE 3 employs only one charge mixture inlet in each reactor dividing the total catalyst column or bed effectively into two catalyst columns or beds or reaction zones of approximately equal length or depth, each reactor can be provided with a plurality of pairs of charge mixture inlets as described in the co-pending application for United States Letters Patent, Serial No. 285,484, filed May 1, 1952, now U.S. Patent No. 2,763,598, issued September 18, 1956. Throttling means 394 and 395 are regulated as described in application Serial No. 285,481, filed May 1, 1952, in the name of Kenneth M. Elliott, so that the quantities of the charge mixture passing through zones A and B are so proportioned that the effluents from both zones have substantially the same octane rating. As a consequence, the total pressure and the hydrogen partial pressure in both zones is substantially the same. It is to be noted that all or a portion of the effluent from zone A can be passed through drier 405 via line 407 under control of valve 406 and returned to line 392 through line 408. The effluents from zones A and B of reactor 326 are mixed in line 396 and flow to distributor 397 in reactor 327.

The mixed effluents from reactor 326 are the charge mixture to reactor 327. A portion of this charge mixture or mixed effluent from reactor 326 flows upwardly from distributor 397 through reaction zone C counter-current to the downwardly flowing substantially compact column of particle-form solid reforming catalyst to leave the reaction zone C through collector 398 and line 400, while the balance of the charge mixture flows downwardly from distributor 397 concurrent with the downwardly flowing substantially compact column of particle-form solid reforming catalyst through reaction zone D and leaves reaction zone D through collector 399 and line 401.

Throttling means 402 in line 400 and 403 in line 401 are regulated as described in application Serial No. 285,481 to control the distribution of the charge mixture between zones C and D so that the effluents from zones C and D have substantially the same octane rating. In order to reduce the amount of moisture in the effluent from zone C, the effluent from zone C or a part thereof is bled-off through line 409 under control of valve 410, passed through drier 411 and returned to line 400 through line 412. The effluents from zones C and D are mixed in line 404 and flow thence to heat exchangers, condensers, separators, fractionators and storage or distribution as described in conjunction with FIGURE 1.

It will be noted that in the method of reforming hydrocarbon reactant illustrated in FIGURE 3 and described hereinbefore, there is both counter-current and concurrent flow of the charge mixture and the catalyst columns. The method illustrated in FIGURE 4 provides much greater flexibility since flow can be all counter-current, all concurrent or counter-current and concurrent.

Figure 4:
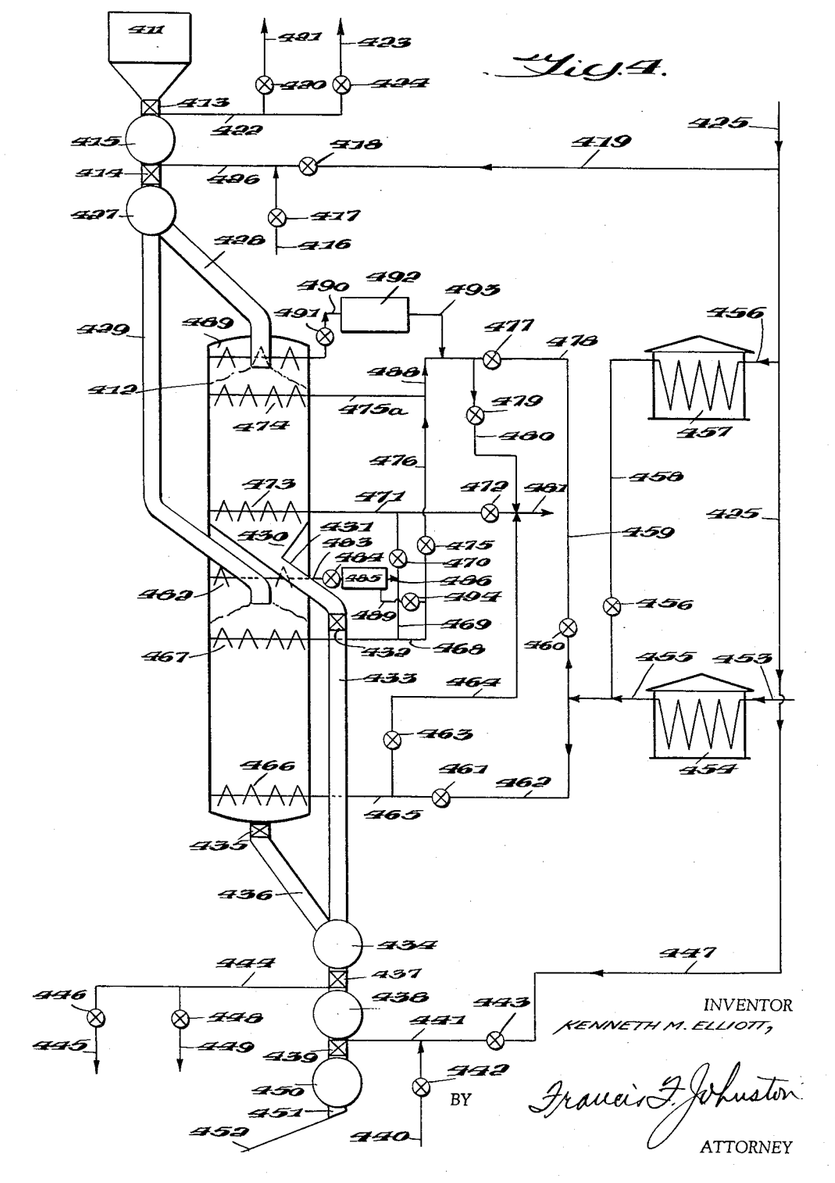
FIGURE 4 is a highly schematic flow sheet illustrative of a method of reforming a hydrocarbon reactant in accordance with the principles of the present invention in which the catalyst passes in parallel flow through two reaction zones in the same reactor and the hydrocarbon reactant passes through the aforesaid reaction zones in series wherein provision is made for countercurrent flow of reactant and catalyst in both reaction zones or concurrent flow of reactant and catalyst in both reaction zones, or concurrent or counter-current flow of reactant and catalyst in one reaction zone with concurrent flow of reactant and catalyst in the other reaction zone.

Referring now to FIGURE 4, active catalyst in feed hopper 411 is transferred to the upper and lower reaction zones of reactor 412 by any suitable means. When the upper and lower reaction zones of reactor 412 are operated at pressures substantially above atmospheric, 15 p.s.i.a., a transfer means suitable to transfer particle-form solid contact mass material from a zone of given pressure to a zone of higher pressure without substantial loss of vapors from the zone of higher pressure is provided. Such a catalyst transfer and reactor-sealing means is illustrated in FIGURE 4 as comprising gas-tight valves 413 and 414 and intermediate pressuring chamber 415. The catalyst transfer and reactor-sealing means illustrated operates in a cyclic manner as follows: With gas-tight valve 414 closed, gas-tight valve 413 opens and catalyst flows from feed vessel 411 into pressuring chamber 415. When chamber 415 is filled with catalyst to a predetermined level gas-tight valve 413 closes. Pressuring chamber 415 is then purged with an inert and/or non-flammable gas such as flue gas flowing from a source not shown through pipes 416 and 426 under control of valve 417 with valve 418 in pipe 419, and valve 424 in pipe 423 closed. The purge is vented through pipes 422 and 421 under control of valve 420. When chamber 415 is purged, valves 417 and 420 are closed and chamber 415 pressured to at least reactor pressure and preferably about 5 to 10 p.s.i. above reactor pressure with a suitable gas such as recycle gas flowing under pressure from a source not shown through pipes 425, 419 and 426 under control of valve 418. When the pressure required in chamber 415 is attained, valve 418 closes and gas-tight valve 414 opens permitting catalyst to flow into surge chamber 427. When chamber 415 is empty of catalyst, valve 414 closes and the gaseous contents thereof is vented through pipes 422 and 423 under control of valve 424. When the pressure in chamber 415 is lowered to that of feed vessel 411, valve 424 is closed and chamber 415 is purged with an inert and/or non-flammable gas as described hereinbefore. This completes a cycle.

The catalyst in surge chamber 427 flows as a substantially compact column of particle-form solid reforming catalyst through conduit 428 to the upper reaction zone of reactor 412 and through conduit 429 to the lower reaction zone of reactor 412.

Referring now to the upper reaction zone of reactor 412, catalyst flows as a substantially compact column of particle-form solid reforming catalyst downwardly through conduit 428 and the upper reaction zone to catalyst collector 430 thence through conduit 431 under control of catalyst flow control means 432 to conduit 433. In passage through the upper reaction zone, coke is deposited on the catalyst partially deactivating it. The partially deactivated catalyst flows downwardly through conduit 433 to surge chamber 434.

Referring now to the lower reaction zone of reactor 412. Catalyst flows as a substantially compact column of particle-form solid reforming material downwardly through conduit 429 and through the lower reaction zone. During passage through reaction zone B, coke is deposited on the catalyst partially deactivating it. The partially deactivated catalyst flows from the lower reaction zone under control of catalyst flow control 435, which like catalyst flow control 432 can be of any suitable type such as a throttle valve. The catalyst flows along conduit 436 to surge chamber 434 where it mixes with partially deactivated catalyst from the upper reaction zone.

When the kiln or kilns in which the partially deactivated catalyst is regenerated are operated at a pressure substantially below that of the reactor, a catalyst transfer and reactor-sealing means is employed. The catalyst transfer and reactor-sealing means is of any suitable type whereby particle-form solid contact mass material can be transferred from a zone of given pressure to a zone of lower pressure without substantial loss of vapors from the zone of higher pressure. A suitable catalyst transfer and reactor-sealing means comprises, as illustrated in FIGURE 4, gas-tight valves 437 and 439 and intermediate depressuring chamber or vessel 438. This catalyst transfer and reactor-sealing means operates in a cyclic manner as follows: With gas-tight valves 437 and 439 closed, depressuring chamber 438 is purged with an inert and/or non-flammable gas such as flue gas flowing from a source not shown through pipes 440 and 441 under control of valve 442 with valve 443 closed. The purge is vented through pipes 444 and 445 under control of valve 446. After purging, valves 442 and 446 are closed and chamber 438 is pressured to reactor pressure with a suitable gas such as recycle gas flowing from a source not shown through pipes 425, 447 and 441 under control of valve 443. When the pressure in chamber 438 is about that of reactor 412, valve 443 is closed and gas-tight valve 437 is opened permitting catalyst to flow from surge chamber 434 into chamber 438. When chamber 438 is filled with catalyst to a predetermined level, gas-tight valve 437 is closed and valve 448 in pipe 449 is opened and the vaporous contents of chamber 438 vented through pipes 444 and 449 until the pressure in chamber 438 is about that of the kiln (not shown). Chamber 438 is then purged with an inert and/or non-flammable gas, such as flue gas, as described hereinbefore. After purging, gas-tight valve 439 is opened permitting catalyst to flow into surge chamber or vessel 450. When vessel 438 is empty of catalyst, gas-tight valve 439 closes completing a cycle.

The partially deactivated catalyst flows from surge vessel 450 through conduit 451 to chute 452 and thence to suitable catalyst transfer means (not shown) whereby the catalyst can be transferred to a kiln. Suitable catalyst transfer means are among others, gas-lifts and the like, elevators, etc.

In the kiln or regenerator the coke deposited on the partially deactivated catalyst is burned off in a stream of combustion supporting gas such as air. The catalyst flows downwardly through the kiln and is transferred to feed bin 411 in any suitable manner completing a catalyst cycle.

The hydrocarbon reactant flows under pressure from a source not shown through line 453 to heater 454. The heated hydroacrbon reactant leaves heater 454 by way of line 455.

Recycle gas comprising at least about 25 percent hydrogen and preferably about 35 to about 60 percent hydrogen, balance $C_1$ to $C_6$ hydrocarbons flows under pressure from a source not shown through pipes 425 and 456 to heater 457. The heated recycle gas, flows from heater 457 through pipe 458 to line 455 under control of valve 456. The recycle gas is mixed with heated hydrocarbon reactant in line 455 in the mol ratio of about 1 to about 15, preferably about 4 to about 10 mols of gas or about 1 to about 8, preferably about 2 to about 5 mols of hydrogen per mol of hydrocarbon reactant to form a charge mixture.

The hydrocarbon reactant and the recycle gas are heated in furnaces 454 and 457 respectively to temperatures such that when mixed in the proportions set forth hereinbefore, the charge mixture shall have a temperature of about 850° to about 1050° F., preferably about 900° to about 1000° F. The heated charge mixture flows through line 455 to line 459. For completely counter-current flow or for counter-current flow through the lower reaction zone and concurrent flow through the upper reaction zone, valve 460 in line 459 is closed and valve 461 in line 462 is opened.

For counter-current flow in the lower and upper zones of reactor 412, valve 463 in line 464 is closed and the charge mixture flows along lines 462 and 465 to distributor 466 in the lower reaction zone. The charge mixture flows upwardly counter-current to the downwardly flowing substantially compact column of particle-form solid reforming catalyst in the lower reaction zone. The major portion of the charge mixture leaves the lower reaction zone through collector 467 and lines 468 and 469 under control of valve 470 while a minor portion sufficient to remove the water present or potential in the catalyst, say about 1 to about 10 percent of the charge is bled-off though collector 482 and line 483 under control of valve 484 to drier 485 and returned to line 469 through line 486. The effluent from the lower reaction zone flows from line 469 under control of valve 470 with valve 475 in line 476 closed to line 471 and, with valve 472 closed, thence to distributor 473 in the upper reaction zone.

The effluent from the lower reaction zone, now charge mixture to the upper reaction zone, flows upwardly from distributor 473 counter-current to the downwardly flowing substantially compact column of particle-form solid reforming catalyst in the upper reaction zone. The major portion of the charge mixture leaves the upper reaction zone through collector 474, lines 475a, 488 and 480 under control of valve 479 (valve 477 closed) while a minor portion, sufficient to remove the water present or potential in the catalyst say about 1 to about 10 percent of the charge, is bled-off through collector 489 and line 490 under control of valve 491 to drier 492 and returned to line 488 through line 493. The mixed effluents flow through line 488 (valve 477 closed) to line 480 and thence under control of valve 479 through line 481 to heat exchangers, etc., as shown in FIGURE 1.

For counter-current flow in the lower reaction zone and concurrent flow in the upper reaction zone, the charge mixture flows from line 453 to heater 454 and line 455 with valves 460 and 463 closed and with valve 461 open through line 462 to line 465 and distributor 466. Thence the charge mixture flows upwardly counter-current to the downwardly flowing substantially compact column of reforming catalyst in the lower reaction zone. A major portion of the charge mixture leaves the lower reaction zone through collector 467 and lines 468 and 476 under control of valve 475, while a minor portion sufficient to remove water present or potential in the catalyst, say about 1 to about 10 percent is beld-off through collector 482 and line 483 under control of valve 484 to drier 485. The dried effluent flows from drier 485 through line 487 to line 476 and thence to line 475a where, with valves 477 and 479 closed, the effluent from the lower reaction zone, now charge mixture to the upper reaction zone, flows through line 475a to distributor 474.

A major portion of the charge mixture flows downwardly concurrent with the downwardly flowing substantially compact column of particle-form solid reforming catalyst while a minor portion sufficient to remove water present or potential in the catalyst, say about 1 to about 10 percent of the charge mixture flows upwardly to collector 489 and thence through line 490 under control of valve 491 to drier 492. The dried effluent is returned through lines 493 and 488 (valves 477, and 479 closed) to line 475a and distributor 474. The major portion of the charge mixture leaves the upper reaction zone through collector 473 and line 471 under control of valve 472 and flows through line 481 to heat exchangers, etc., as shown in FIGURE 1.

For concurrent flow in the upper and lower zones of reactor 412, the heated charge mixture flows along line 453 to heater 454 and line 455. With valve 460 open and valve 461 closed, the charge mixture flows to lines 459 and 478 and thence with valves 479 and 475 closed, flows through lines 488 and 475a under control of valve 477 to distributor 474. A minor portion of the charge mixture sufficient to remove water present or potential in the catalyst, say about 1 to about 10 percent of the charge mixture flows upwardly from distributor 474 to collector 489 and thence under control of valve 491 through line 490, drier 492 and line 493 to lines 488 and 475a and distributor 473.

The major portion of the charge mixture flows downwardly from distributor 474 concurrent with the downwardly flowing substantially compact column of particle-form reforming catalyst and leaves the upper reaction zone through collector 473 and lines 471, 469 and 468 under control of valve 470 (valves 475 and 472 closed).

The effluent from the upper reaction zone, now charge mixture to the lower reaction zone, flows along lines 469 and 468 to distributor 467. From distributor 467 a minor portion, sufficient to remove water present or potential in the catalyst, say about 1 to about 10 percent of the charge mixture flows upwardly to collector 482 and thence through line 483 under control of valve 484 to drier 485. The dried effluent flows from drier 485 through line 486 to lines 469 and 468 to distributor 467.

The major portion of the charge mixture to the lower reaction zone flows downwardly from distributor 467 concurrent with the downwardly flowing substantially compact column of particle-form solid reforming catalyst and leaves the lower reaction zone through collector 466 and lines 465 and 464 under control of valve 463. The effluent flows along line 464 to line 481 and thence to heat exchangers, etc., as shown in FIGURE 1.

Those skilled in the art will recognize that, although the principles of the present invention discussed in conjunction with a specific endothermic reaction as illustrative thereof, the principles of the present invention can be applied to any endothermic reaction taking place in the presence of a particle-form solid catalyst wherein heating the organic reactant(s) to temperatures much above the reaction temperature produces undesirable side reactions. In other words, the present invention provides a means for supplying the required heat of an endothermic reaction by heat stored in hot catalyst introduced in parallel into a plurality of reaction zones through which the organic reactant(s) flows in series, whereby at least a major portion, preferably at least 50 percent and especially at least 70 percent of the required heat of endothermic reaction is supplied in the hot catalyst.

The foregoing description of the application of the principles of the present invention to a particular endothermic reaction has not included a discussion of the means whereby the catalyst is heated to at least 50° and 100° F. above the endothermic reaction temperature, before being introduced into the reactors. In those reactions in which the catalyst is reactivated or regenerated at temperatures below the reaction temperature, the catalyst is heated to the required reactor entry temperature in any suitable manner. However, in those reactions in which the catalyst is deactivated by a combustible deposit, the required reaction heat energy is produced and stored in the catalyst by combustion of the combustible deposit in such a manner that the heat produced in the combustion of the deactivating deposit is used to heat the catalyst to the required reactor entry temperature of at least 50° and preferably 100° F., above the endothermic reaction temperature. By suitable means, the amount of the deactivating combustible deposit can be controlled and, as a consequence, the temperature to which the regenerated catalyst is heated can be controlled within relatively narrow limits. Typical of the endothermic reactions in which the catalyst deactivating deposit is combustible is that of reforming hydrocarbons. Accordingly, a reforming unit having a plurality of reaction zones in one reactor or a plurality of reactors can be operated as a heat balanced unit, in such a manner that the combustible deposit produced in the endothermic reforming reaction and deposited on the catalyst is sufficient, when burned-off in the regenerator or kiln, to heat the catalyst to the required reactor or reaction zone entry temperature. To maintain such a balance between the heat required to be introduced into the plurality of reaction zones in the regenerated catalyst, it is necessary to control the production of the combustible deposit or coke within the reaction zones. This control of coke laydown can be controlled by (1) lowering the hydrogen partial pressure in one or more of the reaction zones sufficiently to increase the coke laydown. The hydrogen partial pressure can be reduced (A) by adding inert gas to the recycle gas; (B) by raising the temperature of the liquid-gas separator so that the recycle gas thus produced contains more $C_4+$ hydrocarbons; (C) by introducing olefins into one or more of the reaction zones as by adding olefins to the charge naphtha; and (D) by lowering the operating pressure of one or more of the reaction zones; (2) decreasing the coke laydown by increasing the hydrogen partial pressure. The hydrogen partial pressure can be increased (A) by adding hydrogen from an extraneous source to the recycle gas; (B) by increasing the amount of $C_4+$ hydrocarbons extracted from the recycle gas in the recycle gas absorber; (C) by lowering the temperature of the liquid-gas separator; and (3) decreasing the amount of recycle gas introduced into one or more of the reaction zones.

A reduction in the hydrogen partial pressure from 40 p.s.i. to 30 p.s.i. increases the coke laydown from about 0.8 to about 1.9 weight percent of the charge to about 1.2 to about 2.5 weight percent of the charge. Similarly at a hydrogen partial pressure of 100 p.s.i., the coke laydown is about 0.25 to about 0.52 weight percent of the charge at recycle gas to naphtha mol ratios of 6:1 to 3:1, while at hydrogen partial pressures of 60 p.s.i., the coke laydown is about 0.5 to about 0.9 weight percent of the charge. Since the pounds of catalyst passing through each reaction zone per hour and the specific heat of the catalyst are known, these facts combined with knowledge that the combustion of one pound of coke in the kiln produces about 15,000 B.t.u., it is a mathematical calculation to determine the decrease or increase in coke laydown required to lower or raise the reactor entry temperature of the catalyst. Therefore, by increasing or decreasing the coke laydown in any one of the ways set forth hereinbefore, the reforming reaction requirements of heat or reaction to be supplied by the hot catalyst can be balanced by the heat stored in the reactivated catalyst during combustion of the coke in the kiln, so that at least a major portion, preferably at least 50 percent and particularly at least 70 percent of the required heat of the endothermic reforming reaction is introduced into the plurality of reaction zones in a single reactor or a plurality of reactors by the hot catalyst, and the aforesaid required heat of reaction is produced preferably by balanced heat of combustion produced by combustion of controlled amounts of coke laid down on the catalyst in the reforming zones.

As stated hereinbefore the hydrogen partial pressure can be reduced by adding inert gas to recycle gas, or in general, introducing inert gas into one or more of the reaction zones. An inert gas is a gas of which none, or substantially none, of the constituents adversely affect the reaction taking place in the reaction zone. Nitrogen, flue gas, methane, ethane, propane or in general $C_1$ through $C_3$ hydrocarbons or mixtures of the foregoing are examples of inert gases. Such inert gases can be introduced into one or more of the reaction zones in amounts sufficient to increase the coke laydown sufficiently, that the heat of combustion during regeneration of the additional coke desposited on the coke during the reforming reaction will raise the temperature of the regenerated catalyst to the required reactor entry temperature. Such inert gas can be mixed with the recycle gas upstream of the recycle gas heating furnace (for example, furnace 135, FIG. 1), or introduced into the charge mixture lines 139, 143 and 146, FIG. 1. Olefins can be introduced into the various reaction zones in a similar manner or can be mixed with the naphtha upstream of the naphtha heating furnace 132, FIG. 1.

The hydrogen partial pressure in the reaction zones can also be lowered or raised by increasing or decreasing the concentration of $C_4+$ hydrocarbons in the recycle gas by either raising the temperature of the gas-liquid separator 44 (FIG. 1) to increase the concentration of $C_4+$ hydrocarbons in the recycle gas or by lowering the temperature in gas-liquid separator 44 to decrease the concentration of $C_4+$ hydrocarbons in the recycle gas.

Similarly, the hydrogen-partial pressure can be increased or decreased by greater absorption or less absorption of $C_4+$ hydrocarbons from the recycle gas. Thus, a greater amount of recycle gas can be passed through absorber 126 of FIG. 1, and the stripped recycle gas in whole or part returned to line 46 from line 165 or an additional absorber(s) can be placed on line 46 to increase the amount of light hydrocarbons stripped from the recycle gas. Thus, an auxiliary absorber can be connected across line 46. To increase the hydrogen-partial pressure in the reaction zones, all or part of the recycle gas in line 46 is passed through the absorber. To lower the hydrogen-partial pressure, all or part of the recycle gas is passed around the auxiliary absorber. These latter methods of varying the hydrogen content of the recycle gas can be used separately or in combination and are, together with the addition of inert gas, the preferred methods of regulating the hydrogen-partial pressure in the reaction zones.

I claim:

1. A method for endothermic hydrocarbon conversion which comprises heating a mass of particle-form solid hydrocarbon conversion catalytic material to a heated catalyst temperature at least 50° F. higher than the conversion temperature of an endothermic hydrocarbon conversion, introducing into each of a plurality of adiabatic conversion zones at substantially the same aforesaid heated catalyst temperature a separated portion of the aforesaid mass of heated catalytic material, flowing said separated portion of the aforesaid mass of heated catalytic material through each of said plurality of adiabatic conversion zones, heating a hydrocarbon material to a temperature not substantially higher than the aforesaid conversion temperature of the aforesaid endothermic hydrocarbon conversion and below a temperature at which substantial undesirable thermal hydrocarbon conversions occur, passing at least a portion of said heated hydrocarbon material successively through each of said plurality of adiabatic conversion zones, regulating the aforesaid heated catalyst temperature of the aforesaid heated catalytic material and the weight ratio of said heated catalytic material and said heated hydrocarbon material in each of said plurality of adiabatic conversion zones to supply at least a major portion of the required heat of the endothermic hydrocarbon conversion taking place in each of said plurality of adiabatic conversion zones in the heated catalytic material introduced into each of said plurality of adiabatic conversion zones.

2. The method of claim 1 wherein the flow of heated catalytic material and all of the heated hydrocarbon material is concurrent in each of said plurality of adiabatic conversion zones.

3. The method of claim 1 wherein a gaseous reactant, in addition to the hydrocarbon material, is passed through said conversion zones and said gaseous reactant is heated to at least a conversion temperature but below a temperature at which undesirable reactions occur in said gaseous reactant.

4. The method of claim 1 wherein the catalytic material is reforming catalyst, wherein the hydrocarbon material is petroleum naphtha, wherein a gaseous reactant comprising hydrogen and $C_1$ to $C_4$ hydrocarbons is heated to at least a conversion temperature but below a temperature at which undesirable reactions occur in said gaseous reactant and passed through said conversion zones, and wherein the hydrogen partial pressure is regulated in at least one of said plurality of adiabatic conversion zones through which said petroleum naphtha passes to deposit the amount of coke necessary to heat the catalyst by combustion of said deposited coke to supply at least the major portion of the heat required to raise the temperature of said mass of particle-form solid catalytic material to the heated catalyst temperature.

5. The method of claim 1 wherein the catalytic material is reforming catalyst, wherein the hydrocarbon material is petroleum naphtha, wherein a gaseous reactant comprising hydrogen and $C_1$ to $C_4$ hydrocarbons is heated to at least a conversion temperature but below a temperature at which undesirable reactions occur in said gaseous reactant and passed through said conversion zones, wherein at least a major portion of the vaporous contents of at least all of said plurality of adiabatic conversion zones following the one in which the petroleum naphtha first contacts the hot catalytic material flows concurrently with the flowing catalytic material, and wherein the partial pressure of hydrogen in at least one of said plurality of adiabatic conversion zones is regulated to deposit the amount of coke necessary to heat the mass of catalytic material to the aforesaid heated catalyst temperature by combustion of the coke deposited thereon.

6. The method of claim 1 wherein the catalytic material is reforming catalyst, wherein the hydrocarbon material is petroleum naphtha, wherein a gaseous reactant comprising hydrogen and $C_1$ to $C_4$ hydrocarbons in addition to the hydrocarbon material is passed through said adiabatic conversion zones, wherein said gaseous reactant a temperature at which undesirable reactions occur in is heated to at least a conversion temperature but below a temperature at which undesirable reactions occur in said gaseous reactant, wherein inert gas is introduced into at least one of said plurality of adiabatic conversion zones to regulate the partial pressure of hydrogen therein and to increase the deposition of coke on said reforming catalyst.

7. The method of claim 1 wherein the catalytic material is reforming catalyst, wherein the hydrocarbon material is petroleum naphtha, wherein a gaseous reactant comprising hydrogen and $C_1$ to $C_4$ hydrocarbons in addition to the hydrocarbon material is passed through said adiabatic conversion zones, wherein said gaseous reactant is heated to at least a conversion temperature but below said gaseous reactant, and wherein a controlled amount of light hydrocarbons is introduced into at least one of said plurality of said adiabatic conversion zones to increase the deposition of coke on said reforming catalyst.

References Cited in the file of this patent

UNITED STATES PATENTS

| | | |
|---|---|---|
| 1,995,604 | Davis | Mar. 26, 1935 |
| 2,290,580 | Degnen et al. | July 21, 1942 |
| 2,437,222 | Crowley et al. | Mar. 2, 1948 |
| 2,490,336 | Crowley | Dec. 6, 1949 |
| 2,664,386 | Haensel | Dec. 29, 1953 |
| 2,759,878 | Berg | Aug. 21, 1956 |

UNITED STATES PATENT OFFICE
CERTIFICATE OF CORRECTION

Patent No. 3,054,744 September 18, 1962

Kenneth M. Elliott

It is hereby certified that error appears in the above numbered patent requiring correction and that the said Letters Patent should read as corrected below.

Column 5, Table V, first column, line 16 thereof, strike out "other"; column 7, line 61, for "thorugh" read -- through --; column 9, lines 45 and 46, for "vaports" read -- vapors --; column 14, line 50, for "though" read -- through --; column 19, line 1, strike out "a temperature at which undesirable reactions occur in", and insert the same after "below" in line 1, column 20.

Signed and sealed this 21st day of May 1963.

(SEAL)
Attest:

ERNEST W. SWIDER
Attesting Officer

DAVID L. LADD
Commissioner of Patents